United States Patent
Carlson et al.

(10) Patent No.: US 9,333,588 B2
(45) Date of Patent: May 10, 2016

(54) CRACK AVOIDANCE IN RESISTANCE SPOT WELDED MATERIALS

(75) Inventors: Blair E. Carlson, Ann Arbor, MI (US); Pei-Chung Wang, Shanghai (CN); David S. Yang, Pudong (CN)

(73) Assignee: GM Global Technology Operations LLC, Detroit, MI (US)

( * ) Notice: Subject to any disclaimer, the term of this patent is extended or adjusted under 35 U.S.C. 154(b) by 246 days.

(21) Appl. No.: 13/016,012

(22) Filed: Jan. 28, 2011

(65) Prior Publication Data

US 2012/0193331 A1   Aug. 2, 2012

(51) Int. Cl.
- *B23K 11/11* (2006.01)
- *B23K 11/16* (2006.01)
- *B23K 11/30* (2006.01)

(52) U.S. Cl.
CPC ............. *B23K 11/115* (2013.01); *B23K 11/166* (2013.01); *B23K 11/3009* (2013.01)

(58) Field of Classification Search
CPC ............. B23K 11/115; B23K 11/3009; B23K 11/3008
USPC .............. 219/91.2, 92, 91.21, 94, 117.1, 118, 219/119, 120
See application file for complete search history.

(56) References Cited

U.S. PATENT DOCUMENTS

| | | | |
|---|---|---|---|
| 1,176,614 A * | 3/1916 | Stanley | 219/119 |
| 2,180,396 A * | 11/1939 | Burke | 219/119 |
| 2,181,083 A * | 11/1939 | Payette | 200/267 |
| 2,347,172 A * | 4/1944 | Cox | 200/265 |
| 2,563,107 A * | 8/1951 | Fanger | 219/94 |
| 2,568,242 A * | 9/1951 | Matteson, Jr. | 200/262 |
| 3,632,957 A * | 1/1972 | Hannah | 219/119 |
| 3,718,509 A * | 2/1973 | Germano | 428/554 |
| 3,790,743 A * | 2/1974 | Kimura et al. | 219/145.23 |
| 4,514,612 A * | 4/1985 | Nied | 219/119 |
| 4,738,389 A | 4/1988 | Moshier et al. | |
| 5,066,845 A * | 11/1991 | Anderson | 219/119 |
| 5,455,209 A | 10/1995 | Powell | |
| 5,635,091 A * | 6/1997 | Hori et al. | 219/137.61 |
| 6,018,729 A | 1/2000 | Zacharia et al. | |
| 6,861,609 B2 | 3/2005 | Sigler | |
| 6,903,299 B2 * | 6/2005 | Brown | 219/119 |
| 7,126,077 B2 * | 10/2006 | Wang | 219/117.1 |
| 7,164,094 B2 * | 1/2007 | Offer | 219/76.1 |
| 2002/0011468 A1 * | 1/2002 | Miyasaka et al. | 219/78.02 |
| 2003/0192863 A1 * | 10/2003 | Wang et al. | 219/117.1 |
| 2004/0238500 A1 * | 12/2004 | Brown | 219/119 |
| 2005/0029234 A1 * | 2/2005 | Lu et al. | 219/119 |
| 2006/0022018 A1 * | 2/2006 | Yoshimura et al. | 228/54 |
| 2006/0150387 A1 * | 7/2006 | Kobayashi et al. | 29/458 |
| 2006/0237160 A1 * | 10/2006 | Nitta et al. | 164/418 |
| 2007/0127998 A1 * | 6/2007 | Shim | 409/139 |

(Continued)

OTHER PUBLICATIONS

Miller Electric Mfg. Co., "Handbook for Resistance Spot Welding," Version 003 335A (Jul. 2005).

*Primary Examiner* — David Angwin
*Assistant Examiner* — Lawrence Samuels
(74) *Attorney, Agent, or Firm* — Harness, Dickey & Pierce, P.L.C.

(57) ABSTRACT

Methods of crack avoidance during resistance spot welding are provided. The compressive stress from the spot welding is distributed across an electrode assembly having an enlarged footprint. The electrode assembly includes a conductive core and a non-conductive cover. The delivery of current through the electrode assembly is localized to the conductive core.

9 Claims, 7 Drawing Sheets

(56) References Cited

U.S. PATENT DOCUMENTS

| | | |
|---|---|---|
| 2007/0170153 A1* | 7/2007 | Goto et al. .................... 219/119 |
| 2007/0295704 A1* | 12/2007 | Sigler et al. ............. 219/146.22 |
| 2008/0075551 A1* | 3/2008 | Nakazima ..................... 409/140 |
| 2008/0237303 A1 | 10/2008 | Lin et al. |
| 2009/0152245 A1* | 6/2009 | Wang et al. ................ 219/117.1 |
| 2009/0159570 A1* | 6/2009 | Chen ............................ 219/119 |
| 2010/0258536 A1* | 10/2010 | Sigler et al. ................ 219/117.1 |
| 2012/0021245 A1* | 1/2012 | Chang et al. .................. 428/629 |
| 2012/0183800 A1* | 7/2012 | Chen et al. .................... 428/594 |
| 2012/0315384 A1 | 12/2012 | Abd Elhamid et al. |
| 2013/0005196 A1 | 1/2013 | Lev et al. |

\* cited by examiner

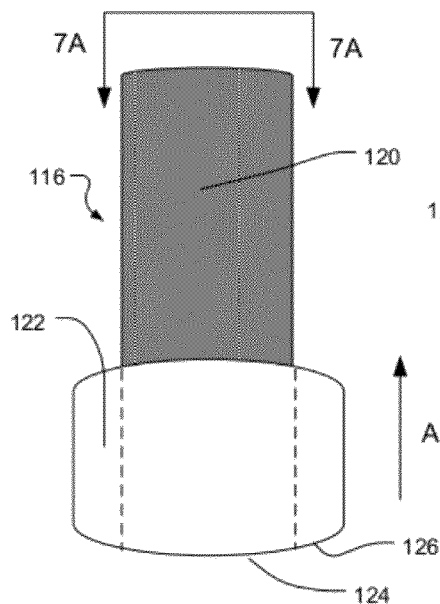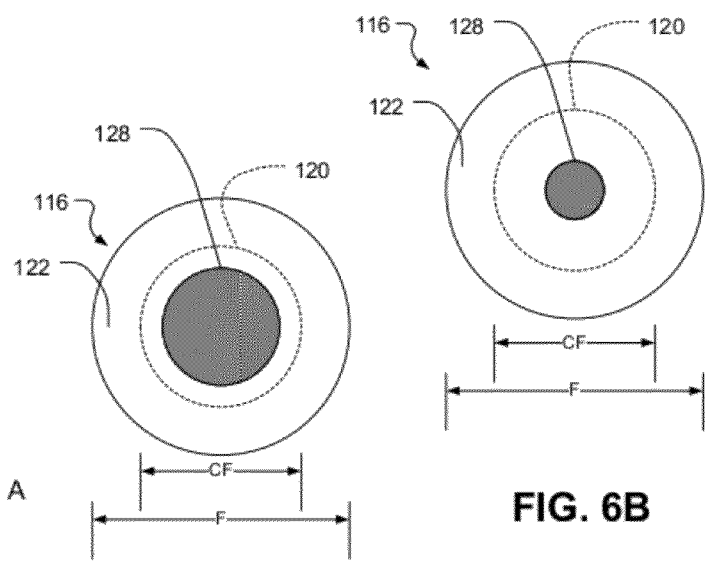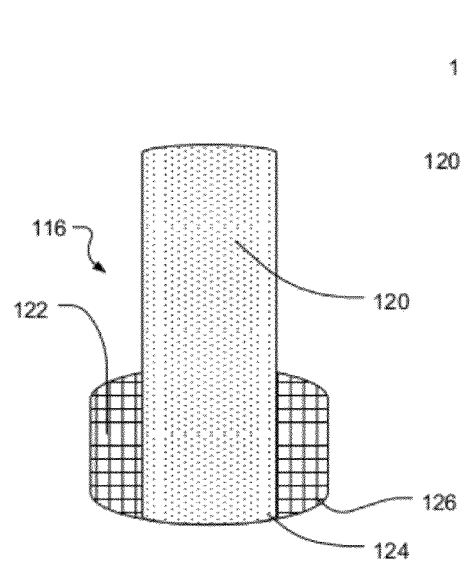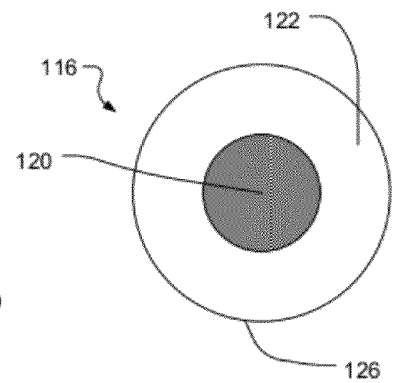
FIG. 5
FIG. 6A
FIG. 6B
FIG. 7A
FIG. 7B

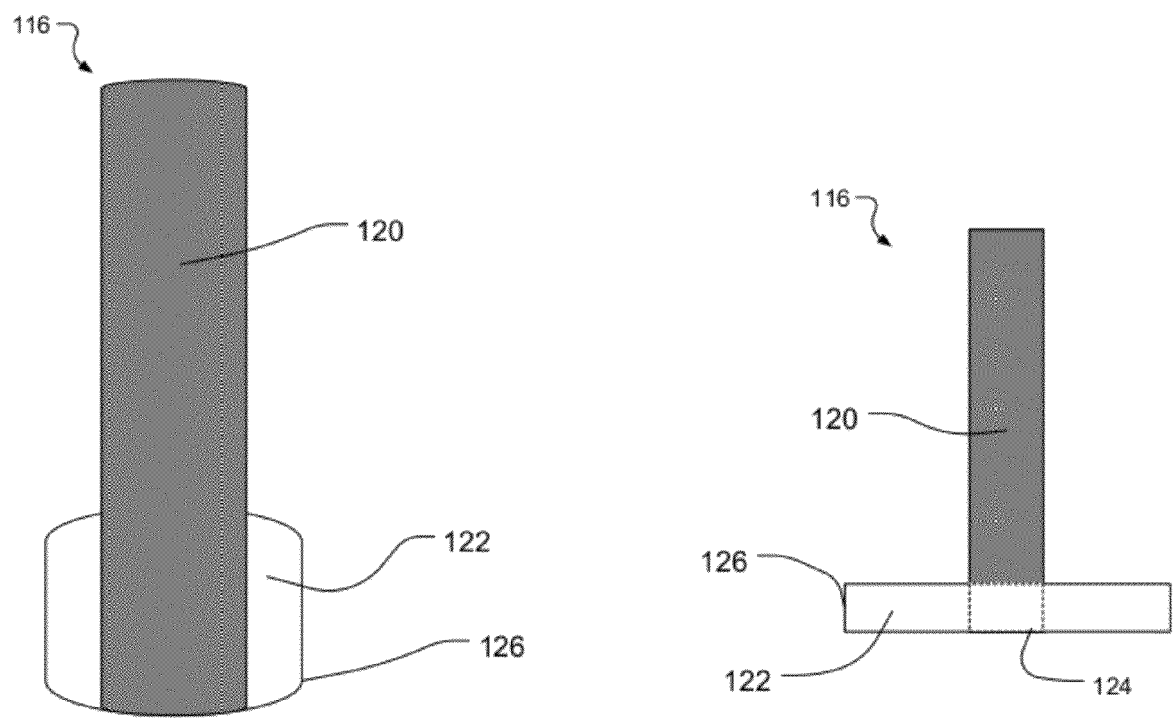
FIG. 8A
FIG. 9
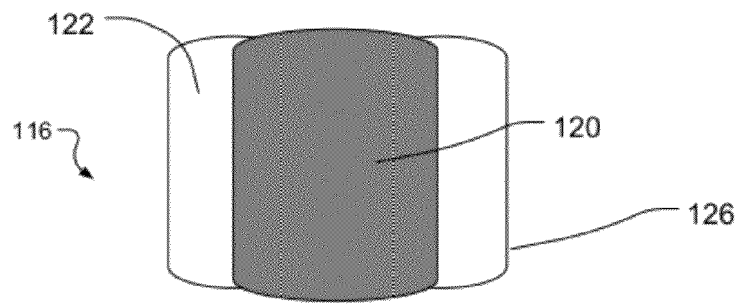
FIG. 8B

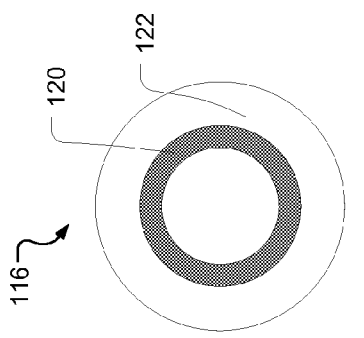
FIG. 10D
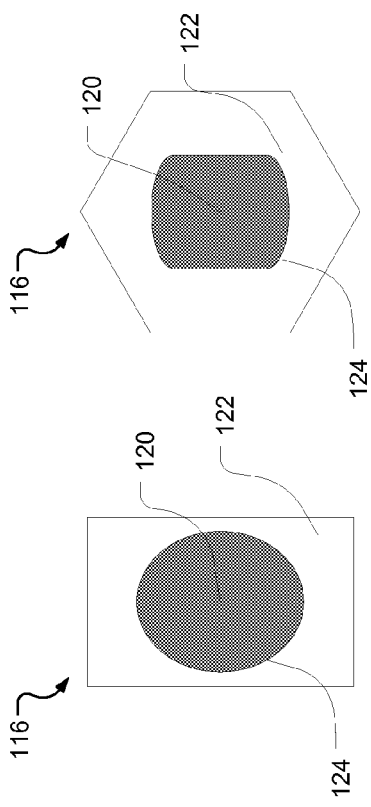
FIG. 10C
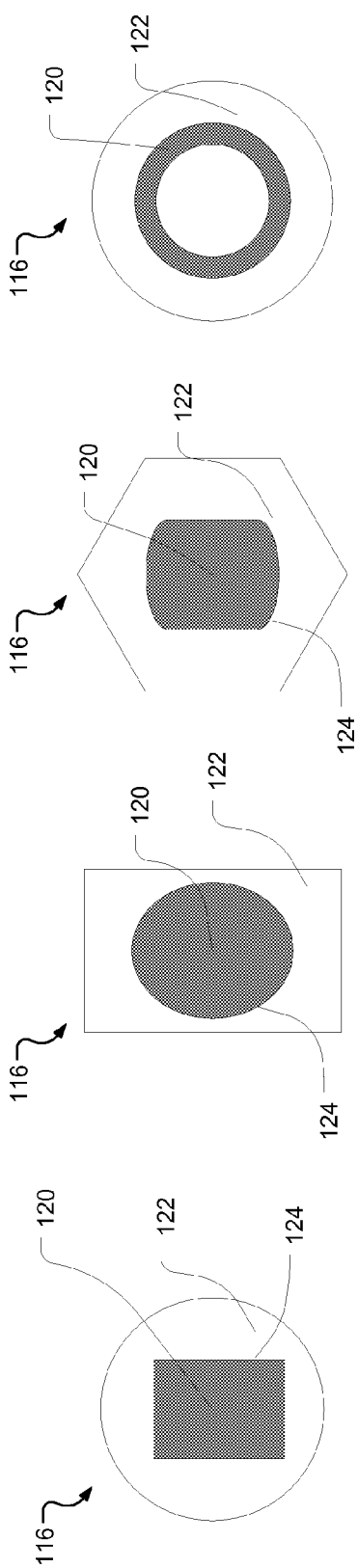
FIG. 10B
FIG. 10A
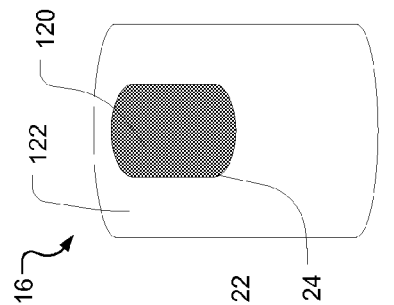
FIG. 10H
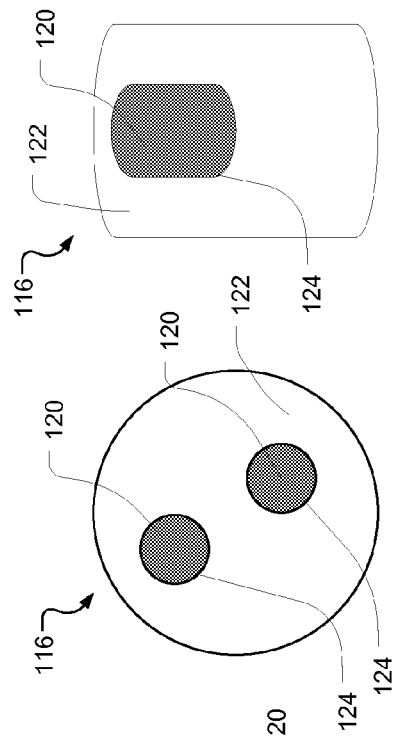
FIG. 10G
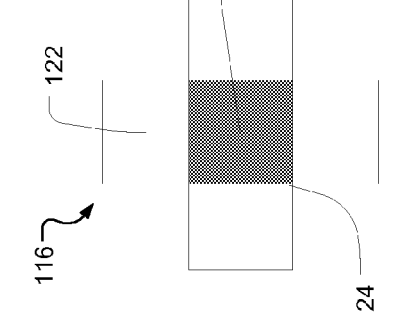
FIG. 10F
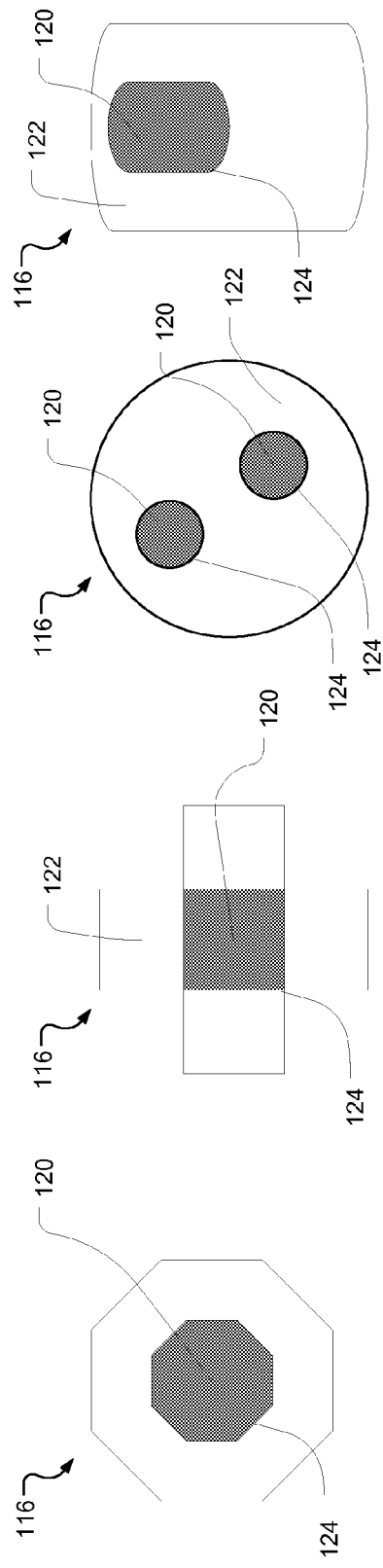
FIG. 10E

CRACK AVOIDANCE IN RESISTANCE SPOT WELDED MATERIALS

FIELD

The present disclosure relates to methods for crack avoidance in resistance spot welded materials.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The construction of automotive bodies and other manufactured products may utilize several uniformly sized electrical resistance spot welds. The welding is performed using a weld gun typically having copper or copper alloy welding electrodes. The sheet metal between the electrodes is briefly melted during current flow and then re-solidifies to form an integral weld nugget of suitable diameter at the abutting surfaces of the sheet metal layers. In manufacturing operations, hundreds of these spot welds are rapidly formed.

Generally, in such operations the welds are substantially the same size, within an acceptable tolerance value, and/or with minimal internal porosity or discontinuities. However, undesired variations can occur in the welds because of electrode wear. The electrode tip may become misshapen to have a mushroom-like shape that must eventually be repaired or dressed, either by hand or by machine, to remove the misshapen region. After a number of dressings the electrodes may become shortened in length and require replacement. Also, as the electrodes are progressively worn, the surface area of the tip of the electrode may increase, and accordingly the current density may decrease. This decrease in current density is known to affect the quality of the spot weld.

SUMMARY

This section provides a general summary of the disclosure, and is not a comprehensive disclosure of its full scope or all of its features.

In various embodiments, the present teachings provide methods for preventing crack formation in resistance spot welded materials. A region of an electrode is covered with a non-conductive material to provide an electrode assembly. A first metal sheet is welded to a second metal sheet with the electrode assembly.

In other embodiments, the present teachings provide methods for reducing crack formation in resistance spot welded materials. A region of an electrode is covered with a non-conductive ceramic material to provide an electrode assembly having a peripheral dimension. A first metal sheet is welded to a second metal sheet with the electrode assembly. At least one indentation is created having the same peripheral dimension as the electrode assembly. A weld is formed on a surface of one of the first metal or the second metal. The weld has a smaller peripheral dimension than the electrode assembly.

In still other embodiments, the present teachings provide methods of reducing crack formation in resistance spot welded materials. A first sheet of a zinc-coated steel is welded to a second sheet of zinc-coated steel with an electrode assembly having a peripheral dimension. The electrode assembly includes a non-conductive ceramic cover disposed about a region of a conductive copper or copper alloy core. At least one indentation having the same peripheral dimension as the electrode assembly is created in one of the first or second sheets.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 depicts an exemplary electrode assembly according to various embodiments of the present teachings;

FIGS. 6A-6B depict exemplary non-conductive electrode covers according to various embodiments of the present teachings;

FIGS. 7A-7B depict a cross sectional view (along line 7A-7A of FIG. 5) and a bottom view, respectively, of an electrode assembly according to FIG. 5 of present teachings;

FIGS. 8A-8B depicts a side view and a bottom view of an exemplary electrode assembly according to various embodiments of the present teachings;

FIG. 9 depicts a side view of an exemplary electrode assembly according to various embodiments of the present teachings;

FIGS. 10A-10H depict various cross-sectional views of exemplary electrode assemblies according to various embodiments of the present teachings.

Corresponding reference numerals indicate corresponding parts throughout the several views of the drawings.

DETAILED DESCRIPTION

Figure 1:
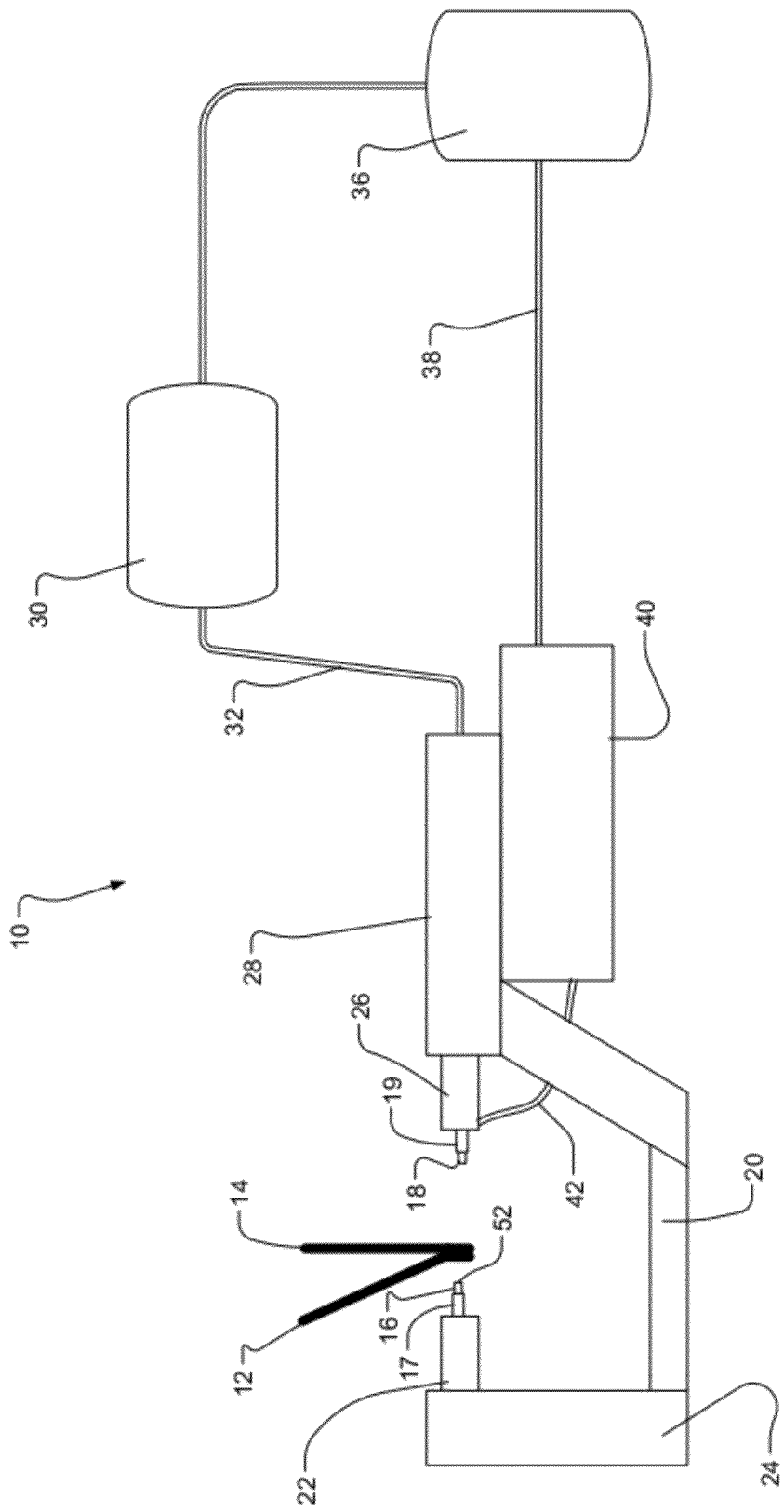
FIG. 1 depicts a schematic diagram of a representative spot welding gun apparatus and the associated equipment and controllers.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical "or." It should be understood that steps within a method may be executed in different order without altering the principles of the present disclosure.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

The present teachings relate to resistance spot welding using a spot welding gun apparatus 10 as shown in FIG. 1 to secure metal sheets 12 and 14 with electrodes 16 and 18. For clarity, a general description of the welding apparatus 10 is provided first, followed by specific information on the materials utilized in the present teachings.

Still referring to FIG. 1, a schematic illustration of a side view of a representative spot welding gun apparatus 10 is shown. An assembly of two or more sheet metal layers 12 and 14 is prepared at a suitable location and transported to the welding gun apparatus 10 for welding. As a non-limiting example, the assembled sheets 12 and 14 may, for example, be previously stamped inner and outer panels for a vehicle body.

The weld gun apparatus 10 includes a fixed electrode 16 mounted on a shank 17 inserted in a holder 22, which is attached to a fixed arm 24 of a welding gun arm 20. A movable electrode 18 is mounted on a shank 19 and inserted in a holder 26 carried in a servomotor drive 28. The servomotor drive 28 is adapted to axially move the movable electrode 18 into clamping engagement with the sheet 14 and press and clamp the sheet 14 into clamping engagement with the sheet 12. The welding gun arm 20 may be stationary or mounted on the end of a robot arm or other conventional multi-axis manipulator.

A process controller 30 is provided for precisely controlling the servomotor drive 28 as well as controlling the robot or other multi axis manipulator that mounts the welding apparatus 10. The process controller 30 is connected to the servomotor drive 28 by conductor cable 32. An encoder (not shown) is associated with the servomotor drive 28 and accurately monitors the motion of the movable electrode 18. A load cell (not shown) may be provided within the electrode holder 26, or elsewhere, to detect the amount of force that is exerted upon the sheets 12 and 14 by the electrodes 16 and 18.

A welding controller 36 is provided for controlling and monitoring the welding apparatus 10. A cable 38 connects the welding controller 36 to a weld transformer 40, and a cable 42 connects the weld transformer 40 to the electrode holder 26.

In operation, process controller 30 activates the servomotor drive 28 to move the electrode 18 into engagement with the sheet 14, and move the sheet 14 into engagement with the sheet 12, so that the sheets 12 and 14 are clamped between the electrodes 16 and 18. The welding controller 36 then regulates the passage of a primary welding current from a remote source (not shown). The welding energy source may be a 60 Hertz, high voltage, low current alternating current. Upon command of welding controller 36, the primary current is delivered through cable 38 to weld transformer 40. Weld transformer 40 converts the primary current to a lower voltage, but higher current. Furthermore, the alternating current may be converted by a suitable rectifier to a direct current for welding. The secondary welding current is provided to electrode 18 through cable 42. The electrode 16 is connected to the opposite pole of the weld transformer via the electrode holder 22 and arm 20. The welding current may be of the order of 5,000 to 45,000 amperes depending upon the requirements of the welding operation. Where 60 cycle alternating current is initially provided, the total welding time for a typical spot weld may, e.g., be from 5 to 40 cycles of the 60 Hertz current.

When movable electrode 18 has been brought into contact with sheet 14, controller 30 initiates the spot weld operation and weld current is delivered through electrodes 18 and 16 as the servomotor drive 28 advances the movable electrode 18 during welding for the purpose of applying a predetermined squeeze force on sheets 12 and 14. Heat from the resistance of the sheet metal between the electrodes 16 and 18 causes the substrate located between the electrodes 16 and 18 to melt.

Figure 2:
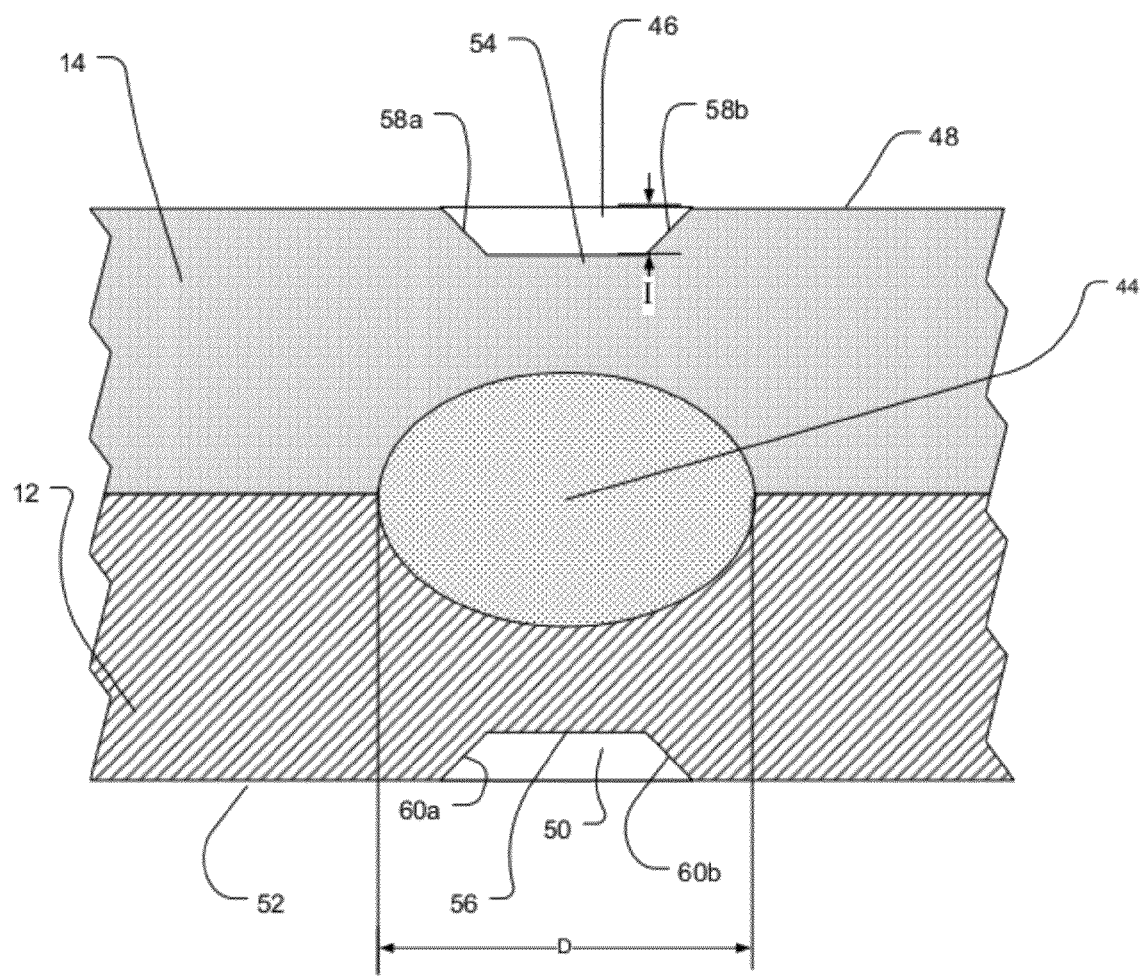
FIG. 2 depicts an enlarged fragmentary sectional view of two sheet metal substrates attached with a spot weld nugget.

Turning to FIG. 2, when the melted metal cools, a spot weld nugget 44 is formed joining sheets 12 and 14 as is shown in the enlarged, fragmentary sectional view. The nugget 44 is depicted as being elliptical in cross section and is formed at the abutting surfaces of sheets 12 and 14. The upper surface 48 of sheet 14 is slightly depressed at indented surface 46 below the level of upper surface 48. This indentation, indicated at "I", from upper surface 48 to indented surface 46 results from the welding force applied by movable electrode 18 and its displacement into the weld heat softened metal of the sheet 14. Indented surface 46 is like a footprint of the tip of movable electrode 18. Similarly, a lower indented surface 50 of sheet 12 is formed on its bottom surface 52 due to the reactive force of fixed electrode 16.

The indented surfaces 46 and 50 include floors 54 and 56, respectively. The floors 54 and 56 are subject to high electrode compressive force. The areas immediately adjacent the floor 54 are shoulder portions 58a and 58b. The shoulder portions 58a and 58b also contact the electrode 18, but the shoulder portions 58a and 58b are subject to compressive force, and thus the highest stresses and current density, as compared to the floor 54. As a result, extensive heat is generated. Similarly, the lower indented surface 50 of the sheet 12 includes shoulder portions 60a and 60b that are also subject to comparatively higher temperatures and pressure than the floor 56.

Materials

The sheets 12 and 14 can be made of any suitable substrate for welding, such as stainless steel. An exemplary substrate is a zinc-coated steel. Yet another exemplary substrate is a transformation induced plasticity or TRIP steel, including zinc-coated TRIP steel. As compared to other advanced high-strength steels, TRIP steel demonstrates better ductility at a given strength level. Still further, TRIP steel provides improved work hardening, stable performance in complex-shape stamping processes, bendability, bake-hardening capacity, product mass reduction capacity, and fatigue performance. It is believed that the transformation of retained austenite (ductile, high temperature phase of iron) to martensite (tough, non-equilibrium phase) during plastic deformation provides these features to TRIP steel.

The same benefits of the TRIP steel also provide challenges at austenite grain boundaries. For example, when welding zinc-coated TRIP steel, the zinc reacts with the copper to cause localized melting along grain boundaries. Once the localized melted area cools and solidifies, there is a difference in phase as compared to the phase of the untreated TRIP steel.

Figure 3:
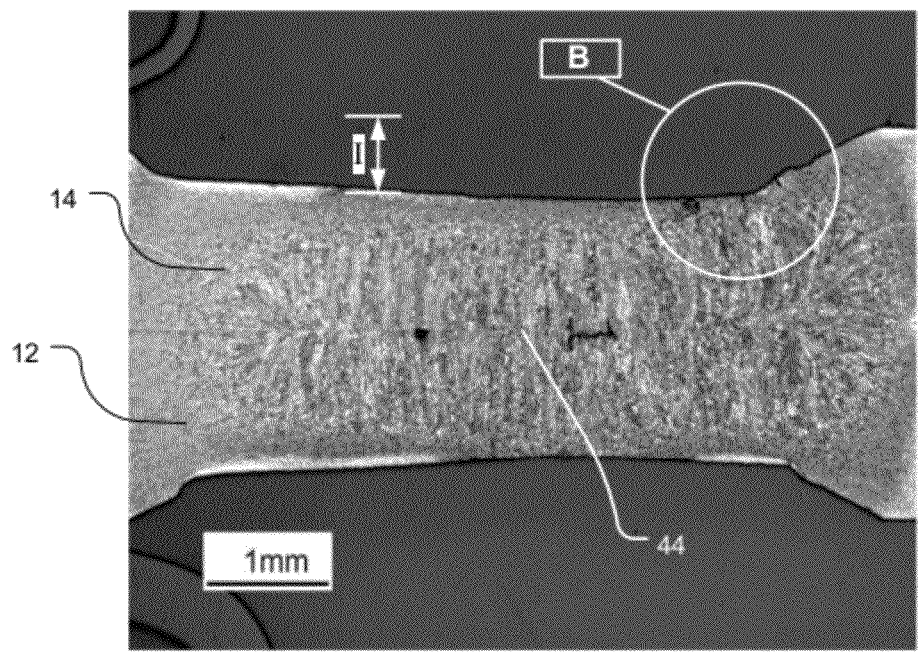
FIG. 3 depicts an enlarged fragmentary section view of two sheet metal substrates attached with a spot weld nugget and having surface cracks.
Figure 4:
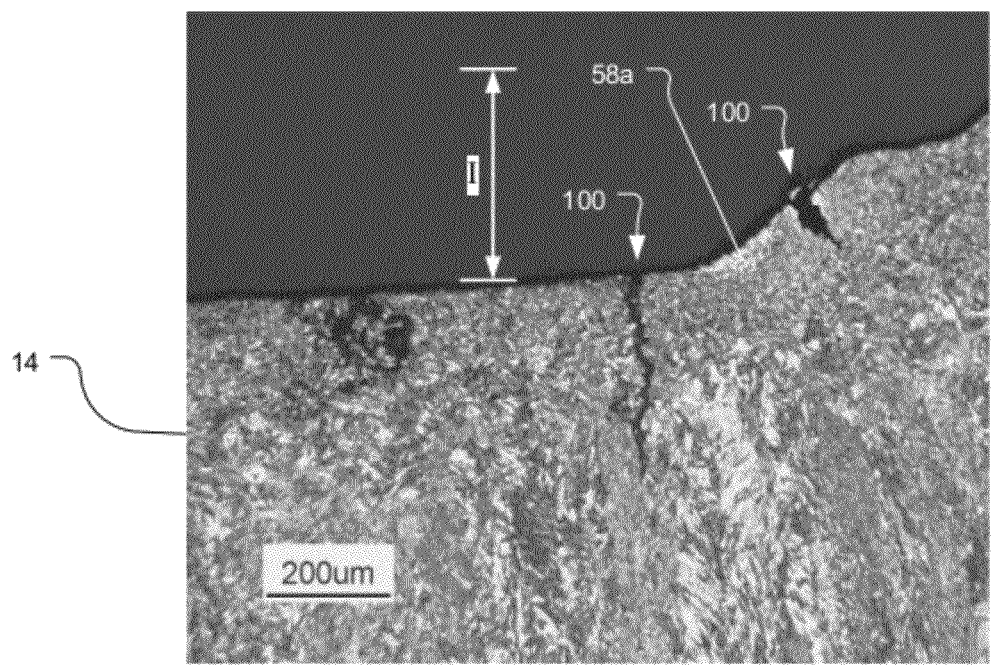
FIG. 4 depicts an enlarged view of the surface cracks of FIG. 3.

With reference to FIG. 2, the floors 54 and 56 that directly contact the electrodes 16 or 18 are hottest and subject to the highest compressive force, while the shoulders 58a, 58b, 60a, and 60b are subjected to a comparatively lower temperature and pressure. This temperature difference cause stress which results in undesirable cracks 100 as illustrated in FIG. 3 at region B which is best depicted in the larger view at FIG. 4. Particularly, the cracks 100 are formed at the transition between the horizontal load and the effective vertical load. Notably, as shown in FIGS. 3 and 4, the cracks 100 appear at the shoulder 58a of the indentation (I) because this is where the zinc has migrated along former austenite grain boundaries and caused local grain boundary de-cohesion and/or formed zinc-copper phases whereby upon cooling, the stresses from the welding process cause the brittle zinc-copper phases to crack.

To address the cracking, it is necessary to redistribute the residual stress that would otherwise be applied to the shoulders 58a, 58b, 60a, and 60b. Accordingly, the electrode assemblies 116 as shown in FIGS. 5 and 7A-10H of the present teachings redistribute the compressive stress across a larger area without delivering heat/current through the entirety of the larger area, as will be detailed below. The redistribution of stress reduces the depth of the indentation (I), and the non-conductive adaptation of the electrode assemblies 116 helps modulate the current flow to improve efficiency of the welding for high-volume manufacturing processes by reducing the downtime from dressing and other repairs. It is understood that the electrode assemblies 116 can be used in the same locations of the electrodes 16 or 18 of FIG. 1.

Turning to FIGS. 5-10H, electrode assemblies 116 include a conductive core 120 having a non-conductive cover 122. These electrode assemblies 116 eliminate, avoid, or resist the presence of surface cracks 100 that would otherwise be caused by welding processes or substantially reduce the occurrence of surface cracks by at least 2%, 10%, 30%, 50%, 70%, 90%, 99%, including all intermediate values. The conductive core 120 is generally made of copper or a copper alloy. The conductive core 120 can have a shape similar to pointed, flat, eccentric, truncated, offset, dome, and radius type electrodes. The conductive core 120 can also be of any other suitable shape for the desired weld, including those shapes detailed later herein.

In various embodiments, the non-conductive cover 122 defines a bore 124 and is disposed about at least a portion of the conductive core 120. Along a contact face 126 (or bottom surface) of the electrode assembly 116, the bore 124 defines a window 128 through which the conductive core 120 contacts the sheet 12 or 14.

The non-conductive cover 122 is made of a material that either does not conduct electricity or that generally conducts less than 10% of the electricity conducted by the conductive core 120. Suitable non-conductive materials will have the required heat-stability and strength for welding operations. Exemplary suitable non-conductive materials include ceramics, glass, and composites thereof. Ceramics useful in the present teachings include, but are not limited to, those that can be broadly classified as alumina-, zirconia-, silicate-, and carbide-containing ceramics, and the like. Specific examples of suitable ceramics include cordierite, steatite, wollastonite, silicon nitride, titanium carbonitride, boron carbide, silicon aluminum oxynitride, silicon carbide, zirconia toughened alumina, and the like. Other suitable non-conductive materials include glass or hybrids of glass and ceramic materials. Another suitable non-conductive cover 122 material is boron nitride.

The non-conductive cover 122 is secured to the conductive core 120 using an adhesive, interference fit, or other temporary fixation devices or elements. In various embodiments, the non-conductive cover 122 is applied using a forging process where the ceramic powder or material is placed into a die about the periphery of the conductive core 120 and subsequently sintered under appropriate heat and pressure to form the electrode assembly 116. In still other embodiments, a separate non-conductive cover 122 is formed by sintering and is subsequently placed over the conductive core 120 using the bore 124. Referring to FIG. 5, in such embodiments, the non-conductive cover 122 is removably fixed to the conductive core 120 so that when there is a need for dressing or repair, the non-conductive cover is removed, the copper core is dressed, and the non-conductive cover 122 is then replaced upwardly along the conductive core 120 in the direction of arrow A. Other suitable application techniques include spray coating, plasma coating, painting, and the like of the non-conductive cover 122 onto the conductive core 120. In such embodiments, the conductive core 120 is selectively masked to control the application of the non-conductive cover 122.

As shown in FIGS. 5 and 7A-10H, the non-conductive cover 122 covers a portion of the conductive core 120. The periphery measurement of the non-conductive cover 122 is generally greater than periphery of the conductive core 120 or at least a portion of the footprint of the conductive core 120.

Referring to FIGS. 6A and 6B, the extent to which the non-conductive cover 122 surrounds the conductive core 120 (outer edge indicated in phantom lines) varies. For example, in FIGS. 6A and 6B, both electrode assemblies have a footprint "F" and conductive cores 120 have a diameter "CF." However, under the same current and pressure conditions, the weld formed by the electrode assembly 116 of FIG. 6A will be larger than the weld made by the electrode assembly of FIG. 6B because the exposure window 128 created at the contact face 126 of FIG. 6B is smaller than the exposure window of FIG. 6A. These non-conductive cover 122 designs provide flexibility in the types of welds that can be formed using a single sized conductive core 120. This provides applicability to previously existing electrodes for retrofit purposes.

Turning to FIGS. 5, 7A, and 8A-10H, the dimensions of the electrode assemblies 116 vary. For example, as shown in FIGS. 5 and 9, the non-conductive cover 122 of FIG. 5 covers a smaller percentage of the total height of the conductive core 120 as compared to that of the electrode assembly 116 of FIG. 9. Also, the non-conductive cover 122 and conductive core 120 of FIG. 5 have widths that are relatively closer in size as compared to the widths of the electrode assembly 116 of FIG. 9. It is understood that the height of the conductive core 120 and the non-conductive cover 122 can also be the same.

Referring to FIGS. 5 and 7A, the electrode assemblies 116 are roughly rectangular with rounded corners. As shown in FIG. 9, the electrode assembly 116 is rectangular with squared corners. This electrode assembly 116 mimics an inverted "T" shape. Modifying the relative sizes of the non-conductive cover 122 and the conductive core 120 modulates load distribution.

In other embodiments, as shown in FIGS. 8A and 8B, the non-conductive cover 122 needs not extend around the entire perimeter of the conductive core 120. As best shown in FIG. 8B, a bottom view of the electrode assembly 116 of FIG. 8A, only the edges or corners of the conductive core 12 are protected using the non-conductive cover 122. The segments of the non-conductive cover are secured using the techniques detailed above. While not depicted, it is understood that more than two regions of the non-conductive cover 122 are useful in the present teachings. For example, six, eight, or ten small non-conductive covers can be unevenly or evenly spaced about the periphery of the conductive core 120.

Turning to FIGS. 10A-10H, the general shapes of the respective non-conductive covers 122 and the conductive cores 120 vary. For example, FIGS. 10A, 10B, 10C, and 10G illustrate that the non-conductive cover 122 need not be of the same geometric shape as the conductive core 120. FIGS. 10D and 10G illustrates that the conductive cover 122 is discontinuous along the welding surface such that the conductive core 120 "interrupts" the conductive cover 122. FIGS. 10G and 10H illustrate that the conductive core 120 is aligned off-center. FIG. 10G further illustrates that the electrode assembly 116 includes multiple conductive cores 120.

When the welding gun 10 is actuated, the clamping or compressive force is distributed over the entire contact face 126 of the electrode assembly 116. However, the current is delivered only to the area(s) directly contacting the conductive core 120 as accessible through the exposure window 128. The region of the sheet 12 or 14 that is in contact with the non-conductive cover 122 does not receive current. This provides focused current delivery at an area that is of a smaller footprint than the footprint of the electrode assembly 116. As compared to an electrode that has the same diameter as the conductive core 120, the electrode assemblies 116 of the present teachings maintain the same current distribution but have a greater distribution of the compressive force across the sheet 12 or 14 for crack minimization and prevention.

Example

Figure 11:
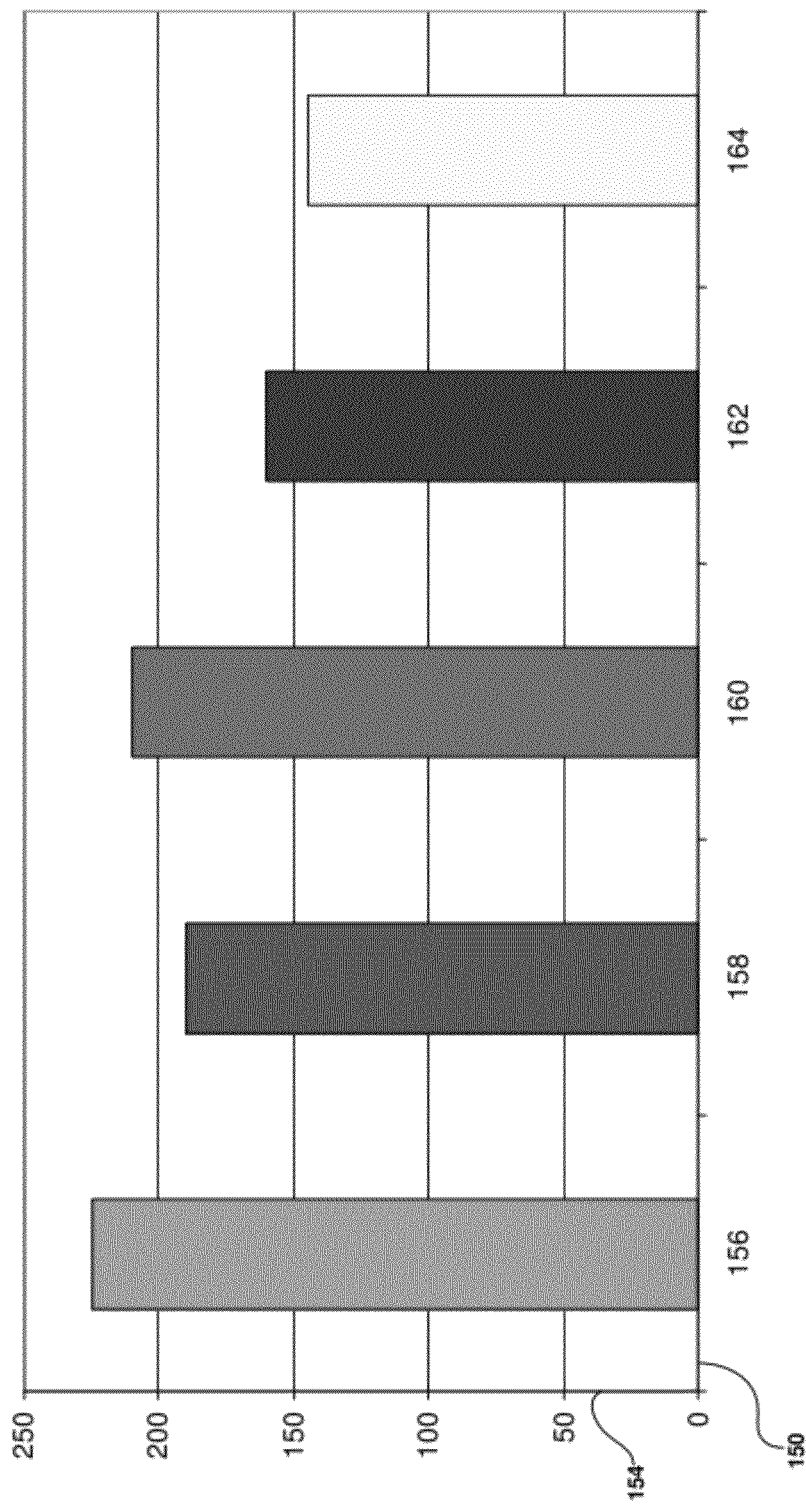
FIG. 11 depicts the effect of stress on electrode assemblies of several radiuses according to various embodiments of the present teachings.

FIG. 11 depicts the relative contact stress after welding. The X-axis, element 150, represents the radius of the welding surface in millimeters (mm). The Y-axis, element 154, represents the contact pressure in megapascals (MPa). Electrode assemblies 116 of the present teachings were tested against a control b-nose electrode (element 156). The control b-nose electrode 156 did not include a non-conductive cover and was used to weld together two TRIP steel sheets, each having a 1 mm thickness. The electrode force was 3 kN and the current was delivered at 7.0 kA for 0.2 seconds. The control b-nose electrode 156 exerted a maximum contact pressure of about 225 MPa.

Using the control b-nose electrode 156 as the conductive core 120, several electrode assemblies 116 having different peripheries were prepared by adding outer non-conductive covers 122. The periphery of the contact surface 126 of the prepared electrode assemblies 116 were 20 mm (element 158), 35 mm (element 160), 50 mm (element 162), and 80 (element 164) millimeters, respectively. Each electrode assembly 116 was tested under the parameters above to secure together two TRIP sheets, each having a 1 mm thickness. The electrode force was 3 kN and the current was delivered at 7.0 kA for 0.2 seconds.

As shown, with the increase in radius size or contact surface area, the contact pressure was significantly reduced. For example, welding with the control b-nose electrode 156, which has the smallest contact periphery, provided a maximum contact pressure of approximately 225 MPa while the maximum contact pressure from the electrode assembly 116 having the largest radius of 80 mm (element 164) was less than 150 MPa. The decrease in contact pressure reduced crack formation and provided improved welding of the substrate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of preventing crack formation in resistance spot welded zinc-coated steel materials comprising:
   securing a removable and replaceable cover made of a non-conductive material to a conductive electrode of an electrode assembly, wherein the conductive electrode defines a bottom contact surface and the removable and replaceable cover made of the non-conductive material covers a portion of the bottom contact surface adjacent to at least one peripheral edge of the conductive electrode so as to define two or more distinct openings, wherein the securing of the removable and replaceable cover to the conductive electrode comprises a technique selected from the group consisting of: mechanical securing, using an adhesive, and combinations thereof;
   welding a first metal sheet to a second metal sheet with the electrode assembly comprising the conductive electrode, wherein at least one of the first metal sheet and the second metal sheet comprises a zinc-coated steel, and the welding comprises:
   contacting the bottom contact surface of the conductive electrode with one of the first metal sheet or the second metal sheet;
   delivering current from the conductive electrode through the two or more distinct openings to the first metal sheet or the second metal sheet while distributing compressive force over the bottom contact surface, to form at least one weld nugget that is substantially free from surface cracks; and
   removing the removable and replaceable cover covering the portion of the bottom contact surface after the welding.

2. The method of claim 1, wherein the at least one weld nugget formed by the welding does not exhibit surface cracks.

3. The method of claim 1, wherein the zinc-coated steel is a zinc-coated transformation induced plasticity steel.

4. The method of claim 3, wherein both the first metal sheet and the second metal sheet comprises a zinc-coated transformation induced plasticity steel.

5. The method of claim 1, wherein both the first metal sheet and the second metal sheet comprises a zinc-coated steel.

6. The method of claim 1, wherein a maximum contact pressure from the electrode assembly is less than 150 MPa during the welding.

7. The method of claim 1, further comprising dressing the conductive electrode after the removing; and
   replacing the removable and replaceable cover on the conductive electrode after the dressing.

8. The method of claim 1, wherein the conductive electrode is a conductive copper core.

9. The method of claim 8, further comprising dressing the conductive copper core after the removing; and replacing the removable and replaceable cover on the conductive copper core after the dressing.

* * * * *